United States Patent [19]
Kao et al.

[11] Patent Number: 5,208,817
[45] Date of Patent: May 4, 1993

[54] MODULATOR-BASED LIGHTWAVE TRANSMITTER

[75] Inventors: Ming-Lai Kao; Yong-Kwan Park, both of Lower Macungie Township, Lehigh County, Pa.

[73] Assignee: AT&T Bell Laboratories, Murray Hill, N.J.

[21] Appl. No.: 866,616

[22] Filed: Apr. 10, 1992

[51] Int. Cl.⁵ .................................... H01S 3/10
[52] U.S. Cl. .................................. 372/26; 385/1; 385/2; 385/3; 372/38
[58] Field of Search ............. 372/26, 28; 385/2, 1, 385/3; 356/345

[56] References Cited

U.S. PATENT DOCUMENTS

| | | | |
|---|---|---|---|
| 4,637,725 | 1/1987 | Stefanov et al. | 356/354 |
| 4,665,363 | 5/1987 | Extance et al. | 385/1 |
| 4,683,448 | 7/1987 | Duchet et al. | 385/2 |
| 4,709,978 | 12/1987 | Jackel | 350/96.14 |
| 4,936,644 | 6/1990 | Raskin et al. | 385/2 |
| 5,073,331 | 12/1991 | Shirasaki | 372/26 |
| 5,109,441 | 4/1992 | Glaab | 385/1 |

Primary Examiner—Léon Scott, Jr.
Attorney, Agent, or Firm—Wendy W. Koba

[57] ABSTRACT

An externally modulated laser-based transmitter is disclosed which utilizes an automatic bias control (ABC) circuit to maintain the bias voltage applied to the external modulator at a predetermined level required to provide the necessary separation between logic levels. The ABC circuit generates a dither signal and functions to digitally compare the phase of the dither signal to the phase of the optical signal produced by the external modulator. A phase comparator (e.g., D-type flip-flop) is used to monitor any drift in the optimum bias point of the modulator and generate an output correction signal by continuously adjusting the level of the DC bias voltage applied to the external modulator.

13 Claims, 5 Drawing Sheets

MODULATOR-BASED LIGHTWAVE TRANSMITTER

BACKGROUND OF THE INVENTION

1. Technical Field

The present invention relates to a modulator-based lightwave transmitter and, more particularly, to an arrangement including means for controlling the operation of the modulator.

2. Prior Art

Semiconductor lasers are frequently used as optical sources for lightwave transmission systems. Modulation methods for lasers generally fall into two categories: (1) direct modulation, where the bias current applied to the laser is itself modulated by an electrical data signal; or (2) indirect (external) modulation, where the bias current to the laser is held constant, and the constant light output from the laser is modulated by the electrical data signal to provide the lightwave output data signal. Direct modulation appears to be limited to data rates less than 1 Gb/s, since inherent characteristics of the laser structure result in frequency chirping at multi-gigabit transmission rates. Thus, external modulation appears to be the preferred alternative for multi-gigabit applications.

A common arrangement for providing external modulation of an optical signal is to utilize a Mach-Zehnder interferometer. The constant optical output from the laser is coupled into the optical input waveguide of the interferometer. The electrical data signal is applied to the electrical inputs of the interferometer such that the optical output replicates the data pattern of the electrical input. Specifically, the optical input signal is split between two waveguide paths formed in a bulk optical material, such as lithium niobate. The applied electrical data signal is coupled to electrodes formed on the bulk material surface. The data signal on the electrodes varies the electric field in the vicinity of the waveguides supporting the optical signal. The presence of the electric field modifies the optical path length of each waveguide, resulting in a phase difference between the optical signals traveling along the two waveguide paths. By proper control of the phase difference, the two optical signals may exit the interferometer either completely in phase (indicating a logical "1", for example), or out of phase (indicating a logical "0", for example).

In theory, external modulation appears to provide the ideal solution to the frequency chirping problem associated with direct modulation. However, long-term stability of interferometers is questionable. The characteristics of such an interferometer, in particular, its transfer curve (i.e., optical output as a function of applied voltage) is known to drift as a function of time, temperature, and various other parameters. Any drift in transfer curve necessarily moves the bias point voltage and results in introducing error into the output optical data signal. A need thus remains in the art for a method of stabilizing the performance of an interferometer when utilized as an external modulator with a laser transmitter.

SUMMARY OF THE INVENTION

The need remaining in the prior art is addressed by the present invention which relates to a modulator-based lightwave transmitter and, more particularly, to an arrangement including means for controlling the operation of the modulator to provide bias correction.

In accordance with an exemplary embodiment of the present invention, an automatic bias control (ABC) circuit is utilized in conjunction with a modulator, such as a Mach-Zehnder interferometer, so as to control the operation of the modulator and prevent drift of the optimum bias point. In general, the ABC circuit provides a bias (DC) voltage to the modulator electrodes where the bias voltage is continuously monitored and adjusted to prevent the bias point from drifting away from the optimum value. In particular, the ABC circuit receives as an input the output optical data signal from the modulator, where the output optical data signal is converted into a reconstructed electrical data signal. The ABC circuit also contains a reference signal (dither) source which operates at a predetermined frequency. The dither signal is impressed upon the electrical data signal input to the modulator (i.e., applied to the automatic gain control input of the electronic driver) so as to amplitude modulate the electrical data signal. A detection arrangement is utilized within the ABC circuit to compare the phase of the dither signal to the phase of the reconstructed electrical data signal. By comparing the phase differences, a bias correction signal is formed and fed back to the interferometer as the DC bias signal for the surface electrodes. Thus, the modulator bias signal may be continuously monitored and maintained at a value required for producing the optimum optical modulated output signal.

In a preferred embodiment of the inventive ABC circuit, a pair of zero-crossing detectors are used to convert the reference dither signal and the reconstructed electrical data signal into digital representations. The outputs from the pair of zero-crossing detectors are subsequently applied as inputs to a phase comparator (for example, a flip-flop) which is utilized to monitor the phase relationship between the two signals. The output from the phase comparator is then filtered and smoothed and applied as the DC bias input to the modulator.

Additionally, in a preferred embodiment of the present invention, the polarization state of the optical signal as it propagates through the external modulator may be controlled by utilizing a polarization maintaining optical waveguide between the laser and external modulator input. Preferably, polarization maintaining optical fiber may be used as the waveguide.

Various alternative embodiments of the present invention will become apparent during the course of the following discussion and by reference to the accompanying drawings.

BRIEF DESCRIPTION OF THE DRAWING

Referring now to the drawings, where like numerals represent like parts in several views.

DETAILED DESCRIPTION

Figure 1:
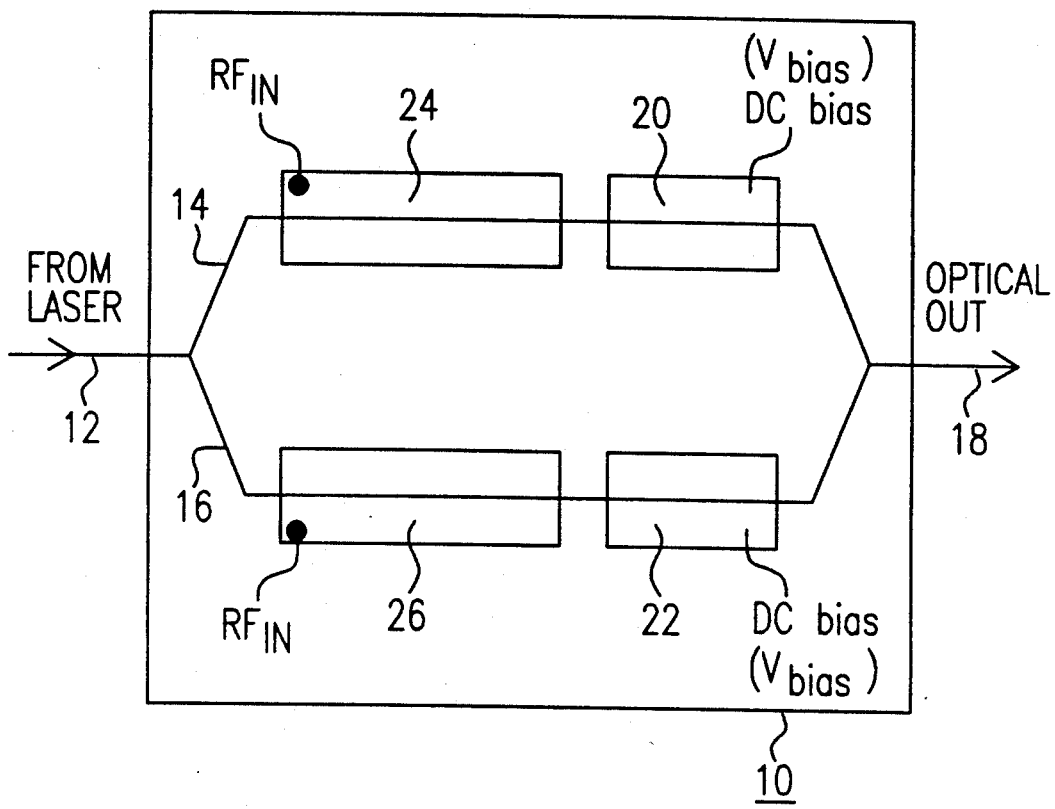
FIG. 1 illustrates, in simplified form, an exemplary Mach-Zehnder interferometer which may be utilized as an external modulator in accordance with the teachings of the present invention.
Figure 2:
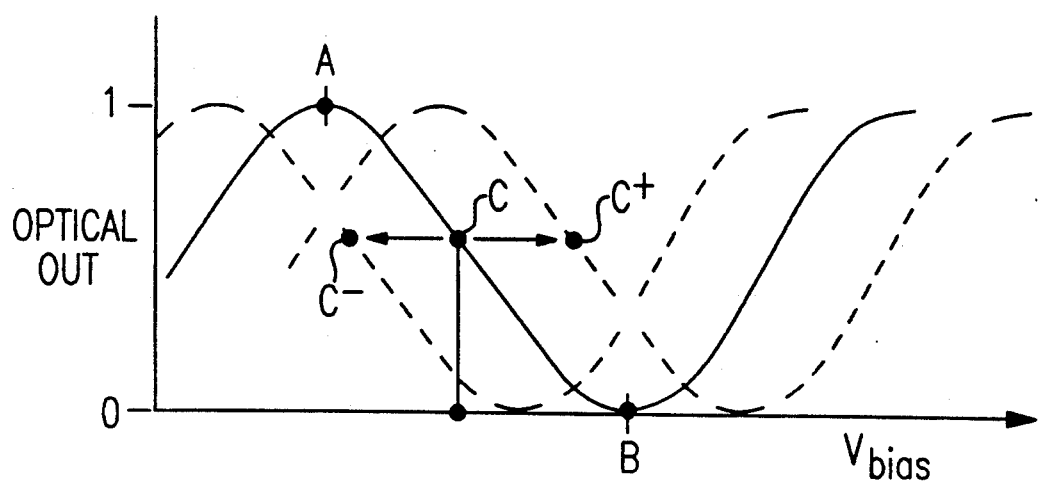
FIG. 2 contains a graph showing the ideal transfer function of the interferometer of FIG. 1.

An exemplary Mach-Zehnder interferometer 10, useful as an external modulator in the arrangement of the present invention, is illustrated in simplified form in FIG. 1. Interferometer 10 may comprise a bulk optic material such as, for example, lithium niobate. Optical waveguides 12, 14, 16 and 18 are formed within the bulk material and may comprise titanium-diffused waveguides, proton-exchanged waveguides, or any other suitable arrangement for providing optical guiding within the bulk material. Referring to FIG. 1, an optical signal from a source, in this case, a constant optical signal from a laser (not shown), is coupled to input waveguide 12. The input optical signal is then split between the two interferometer arms formed by waveguides 14 and 16. The optical signals propagate along waveguides 14 and 16 and are subsequently recombined along output optical waveguide 18 to form the output optical signal from interferometer 10. In accordance with the operation of a Mach-Zehnder interferometer, a plurality of electrodes 20, 22, 24 and 26 are disposed over waveguides 14 and 16 in the manner shown in FIG. 1. The application of electrical signals to these electrodes functions to modify the optical (as opposed to physical) path length of waveguides 14 and 16 such that the signals propagating therealong become 180° out of phase with one another. (FIG. 2 illustrates the ideal transfer function of interferometer 10 of FIG. 1.)

As shown in FIG. 1, the electrodes include a pair of bias electrodes 20,22 and a pair of RF electrodes 24,26. The purpose of the separate electrodes will become clear during the course of the following discussion. For immediate purposes of understanding, it is recognized that for digital signal transmission, interferometer 10 may be biased (via bias electrodes 20 and/or 22) so as to provide maximum light output (i.e., light output from waveguide 14 in phase with light output from waveguide 16, point A in FIG. 2) for one case and minimum light output (i.e., light output from waveguide 14 becomes 180° out of phase with light output from waveguide 16, point B in FIG. 2) for the other. A single-drive modulator circuit may then be utilized to provide the input electrical data signal to the interferometer. At high data rates, however, (e.g., >1 Gb/s), it becomes advantageous to utilize a double-drive modulator, so as to reduce the voltage swing required of the driver between opposing logic values. Thus, for the double-drive arrangement, interferometer 10 may be biased at point C (shown in FIG. 2) and driven in either direction to provide the desired logic values. In particular, therefore, the relative difference in bias voltage applied to the electrodes is utilized to provide the logic 0 and logic 1 outputs. For example, applying the same voltage $V_T$ to each will provide an output of logic 0 (no relative voltage difference) and applying voltage of $V_T \pm \Delta V$ to each will provide an output of logic 1 (maximum relative voltage difference). For the remainder of this discussion it will be assumed that the arrangement utilizes the double-drive configuration, biased at the midpoint of the interferometer transfer function. It is to be understood that the bias control arrangement to be described hereinbelow may also be utilized with a single-drive arrangement to maintain the maximum and minimum bias points at the desired values.

As mentioned above, problems may arise with the utilization of an external modulator in a laser transmitter in that the transfer function of the modulator may move as a function of various environmental factors (e.g., age, ambient temperature, data rate, materials, etc.). Shifting of the transfer function (illustrated in phantom in FIG. 2) thus results in allowing the optimum bias point C to move, as indicated by the arrows in FIG. 2. As shown, the shift results in either a positive movement from bias point C to bias point $C^+$, or a negative movement from bias point C to bias point $C^-$. Movement of this optimum bias point of interferometer 10 in either the positive or negative direction results in decreasing the optical output difference between a logic 1 and logic 0 and thus increasing the bit error rate in the optical output signal from interferometer 10. Accordingly, it is necessary to control the bias applied to interferometer 10 such that the applied DC voltage follows the drifted optimum bias point.

Figure 3:
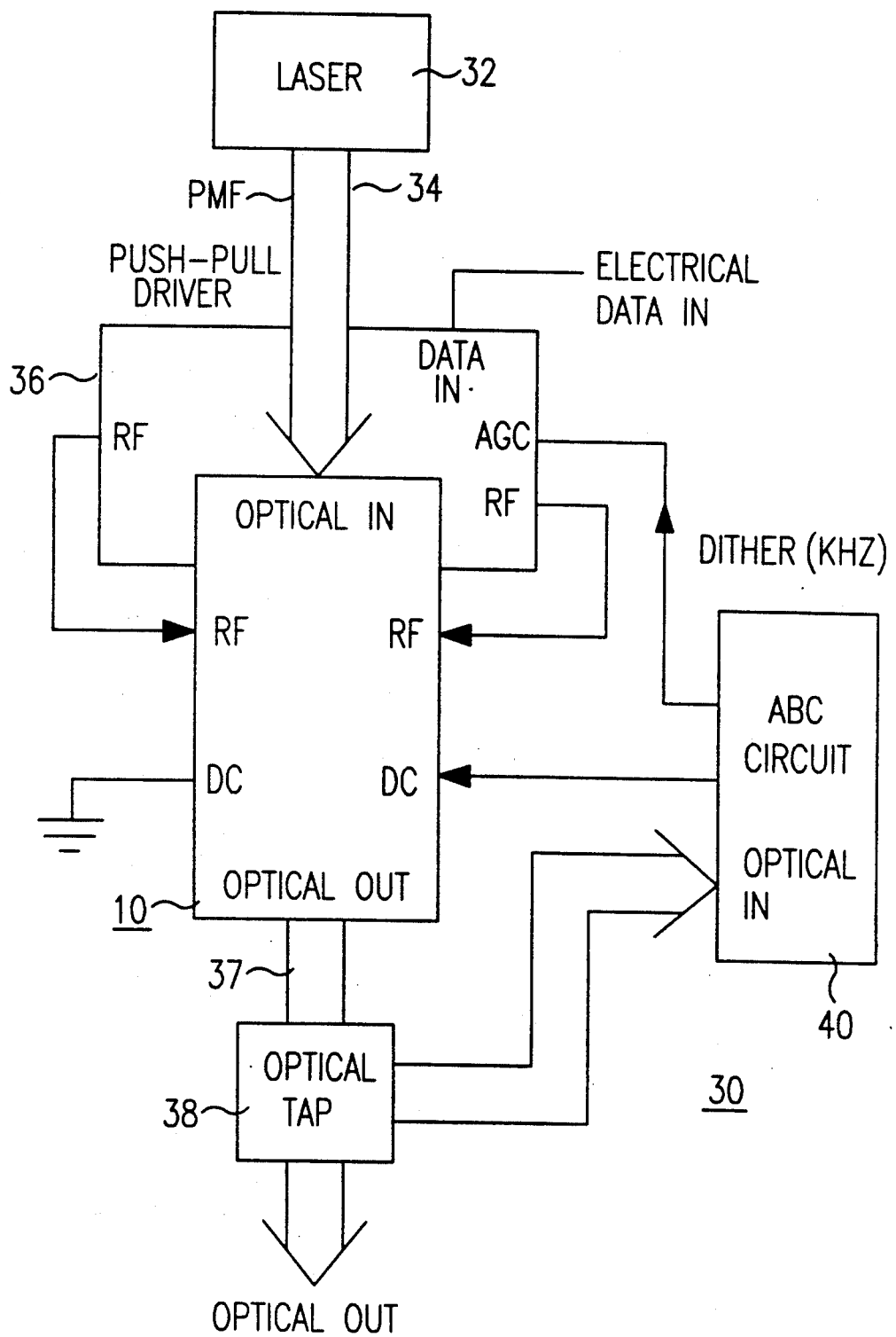
FIG. 3 contains a block diagram of an exemplary modulator-based lightwave transmitter formed in accordance with the present invention.

FIG. 3 illustrates, in simplified form, an exemplary modulator-based transmitter 30 formed in accordance with the teachings of the present invention so as to provide stability to the external modulator. In particular, transmitter 30 includes a Mach-Zehnder interferometer 10 as described above in FIG. 1. A laser source 32 is coupled to the optical input of interferometer 10, where a polarization maintaining waveguide 34 (for example, a section of polarization maintaining fiber) is used to coupled the laser output to the interferometer optical input. The utilization of the polarization maintaining waveguide insures the independent operation of the modulator, regardless of the polarization state of the input optical signal. A differential (push-pull) driver circuit 36, responsive to an input electrical data signal, is used to convert the electrical data signal into a push-pull representation. It is to be understood that such a differential circuit is required only when utilizing a midpoint bias voltage, such as that labeled as "C" in FIG. 2. The differential electronic signal is then coupled to the pair of electrical inputs of interferometer 10, labeled as "RF IN" in FIG. 3 (referring back to FIG. 1, the RF IN inputs are coupled to electrodes 24 and 26 positioned over waveguides 14 and 16, respectively). The DC bias voltage (which may be applied as DC/2 to both electrodes 20 and 22, or simply applied at the full DC value to a selected one of electrodes 20 and 22) is utilized to maintain the bias point of the interferometer transfer function at the ideal (i.e., midpoint) value, and thus preserve the maximum separation between the optical logic 1 and logic 0 values. As shown in FIG. 3, the output optical data signal is subsequently coupled into an optical fiber 37 and provided as the output signal of transmitter 30.

In the ideal case, the arrangement as described above will function as a multi-gigabit lightwave transmitter by modulating a constant level laser output signal with an electrical data signal so as to form the optical data signal. However, as discussed above, the accuracy of the output optical data signal is a function of the long-term stability of the transfer function of interferometer 10. In accordance with the teachings of the present invention, control of the stability is maintained by providing a bias voltage to electrodes on the interferometer which may be continuously adjusted to maintain the desired transfer function midpoint. Referring back to FIG. 3, an automatic bias control (ABC) circuit 40 is utilized which includes a reference dither signal source (shown in FIG. 4) and is responsive to the output optical data signal from interferometer 10. The phases of the reference and data signals are compared and used to generate the bias voltage adjustment applied as an input to interferometer 10. In particular, an optical tap 38 (for example, a fused fiber coupler) is coupled to the output of interferometer 10 and used to provide a portion (e.g. 10%) of the output optical data signal as an input to ABC circuit 40.

Figure 4:
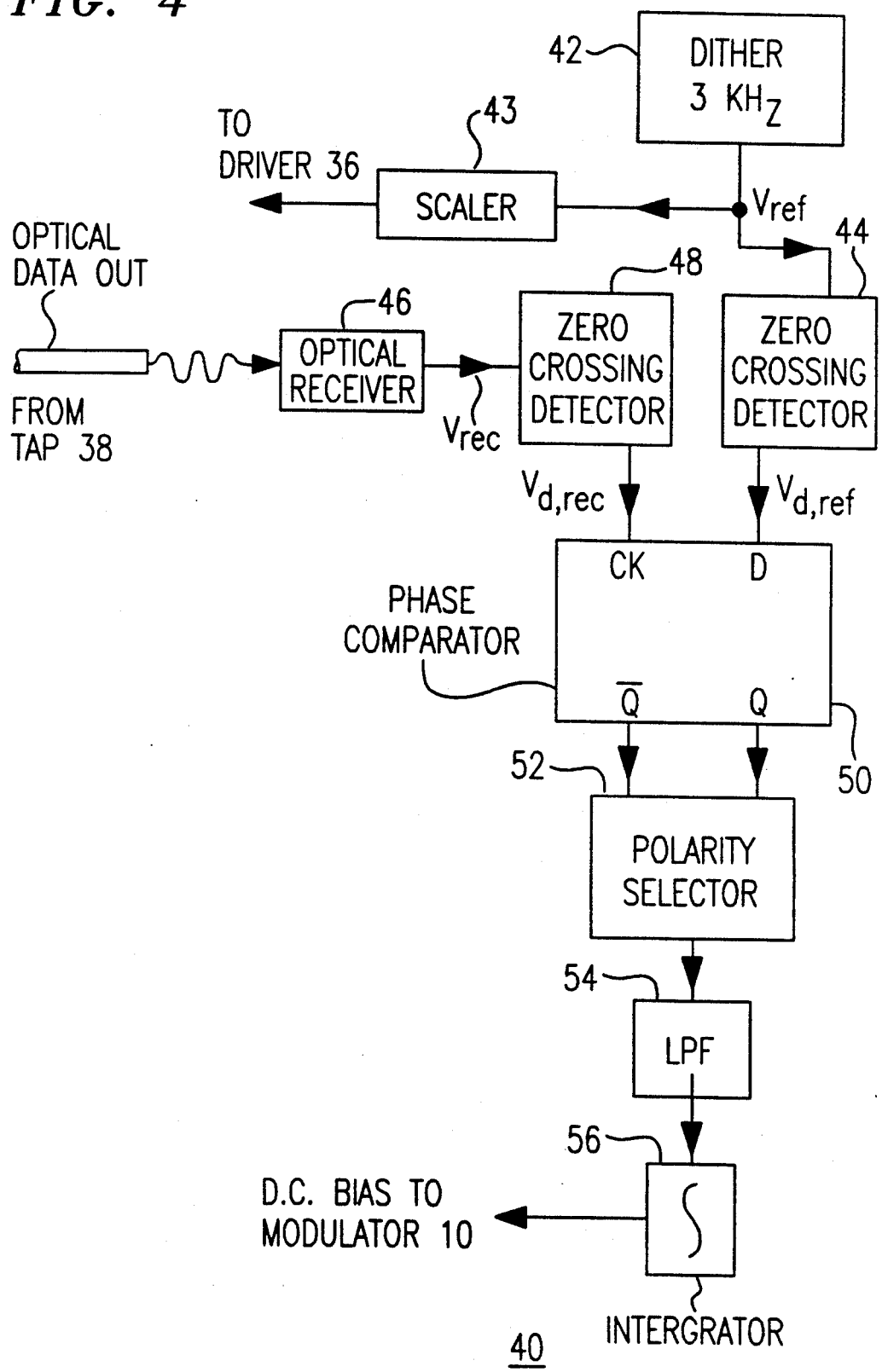
FIG. 4 illustrates in particular the components of an exemplary automatic bias control (ABC) circuit formed in accordance with the present invention.

The details of an exemplary ABC circuit 40 are illustrated in FIG. 4. As shown, a sine wave (dither) source 42, such as a crystal oscillator, is used to generate a signal at a predetermined frequency (for example, $f_{ref}$), this signal being denoted $V_{ref}$. Reference signal $V_{ref}$ is reduced in voltage level within a scaler 43 and subsequently applied as, for example, a gain control input to driver circuit 36 (see FIG. 3). This dither signal will function to amplitude modulate the RF signal output of driver 36 and may then be used to monitor the optimum bias point within interferometer 10. Reference signal $V_{ref}$ is also applied as an input to a first zero-crossing detector 44, which "squares off" $V_{ref}$ to produce a digital version, denoted $V_{d,ref}$. The optical input signal to ABC circuit 40 from optical tap 38 is applied as an input to an optical receiver 46 (such as a PIN-FET receiver) to form a reconstructed electrical representation, denoted $V_{rec}$, of the optical signal at frequency $f_{ref}$. Reconstructed signal $V_{rec}$ is then applied as an input to a second zero-crossing detector 48, which functions similarly to first zero-crossing detector 44, so as to create a digital signal representation (denoted $V_{d,rec}$) of the phase of the recovered signal.

The outputs from the pair of zero-crossing detectors are applied as inputs to a phase comparator 50. A positive output phase comparator 50 indicates that the interferometer transfer curve (as determined from signal $V_{d,rec}$) has drifted in a first direction (e.g.,positive) from the ideal value. A negative output from phase comparator 50 indicates that the transfer curve has drifted in a second direction (e.g., negative) from the ideal value. The output from phase comparator 50, therefore, may be applied to modulator 10 so as to modify the bias voltage such that the voltage may track the movement of the transfer curve. For the particular embodiment illustrated in FIG. 4, phase comparator 50 is shown as a D-type flip-flop. Reference input signal $V_{d,ref}$ from zero-crossing detector 44 is shown as applied to the D input of the flip-flop, and the digitized version of the data signal $V_{d,rec}$ is applied to the clock input. The Q input will follow the D input at each clock (here,data) pulse. The $\overline{Q}$ output, therefore, will also track, but in the opposite direction.

Depending upon whether the positive slope curve or negative slope curve is used to defined midpoint C (see FIG. 2), a polarization selector 52 will choose to monitor either the Q or $\overline{Q}$ outputs to monitor. The output from polarization selector 52 is subsequently filtered and smoother in a low pass filter 54 and integrator 56 and provided as the DC bias voltage adjustment output from ABC circuit 40.

Figure 5:
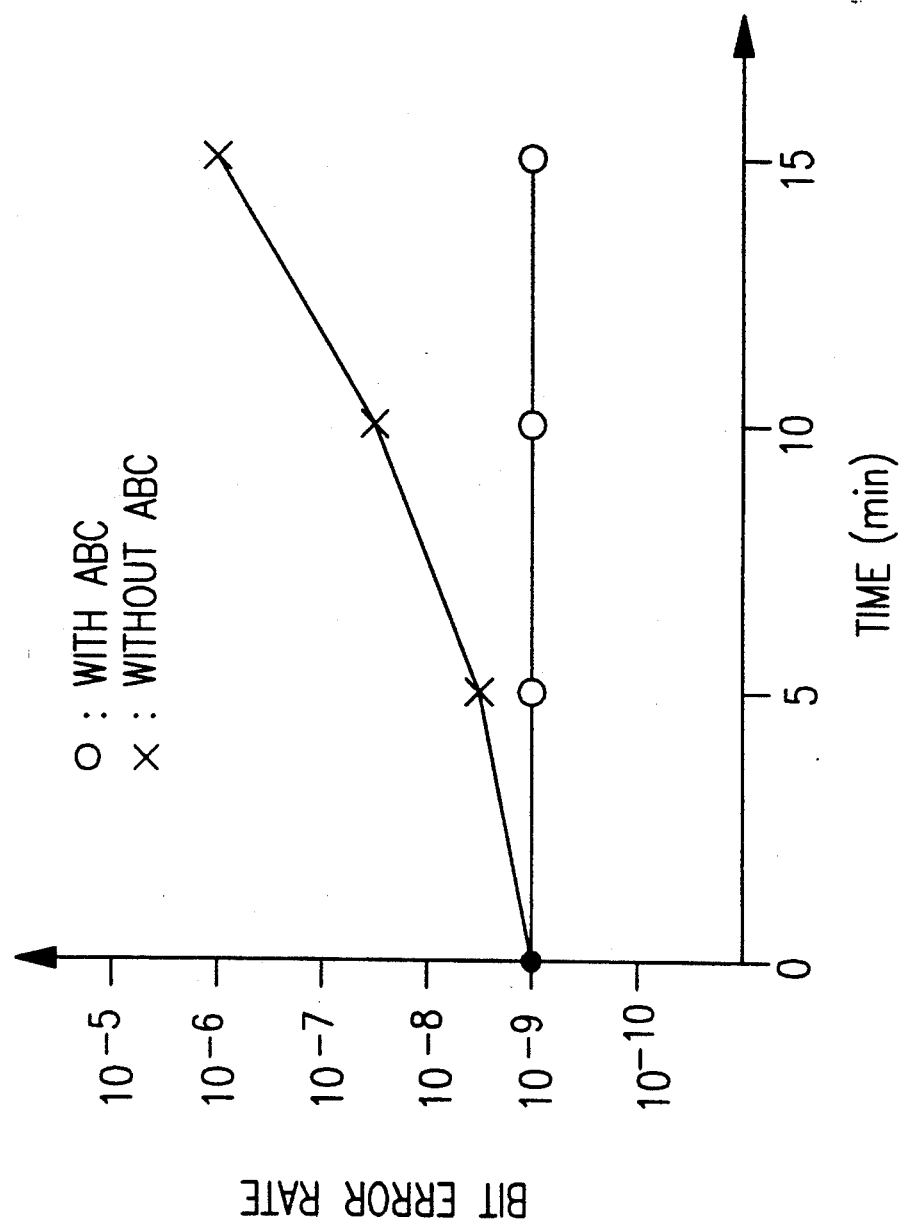
FIG. 5 contains a comparison of the bit error rate (BER) performance of a prior art external modulator to the BER performance of an arrangement utilizing an ABC circuit of the present invention.

FIG. 5 contains a graph illustrating the improvement in bit error rate (BER) performance of an externally modulated laser transmitter when utilizing an ABC circuit of the present invention. In particular, the graph illustrates BER as a function of time. As shown, when the modulator is initially activated the BER (for a 5Gb/s optical input signal) is approximately $10^{-9}$. Without any control circuit on the external modulator, the BER increases to a value of approximately $10^{-6}$ within fifteen minutes of operation. In contrast, when utilizing the ABC circuit of the present invention, the BER remains essentially flat at the initial value of $10^{-9}$.

Figure 6:
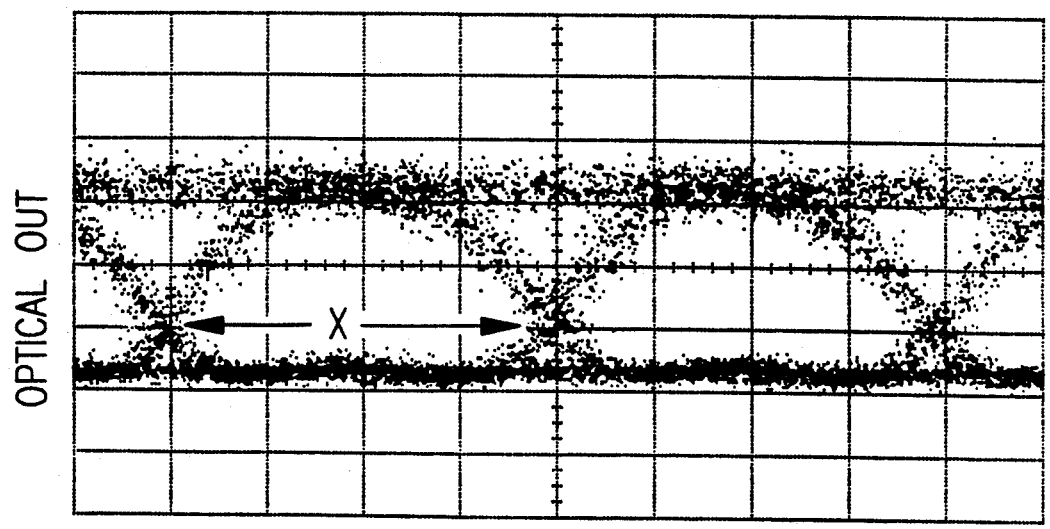
FIG. 6 contains an eye diagram of a 5 Gb/s output signal from a prior art external modulator.
Figure 7:
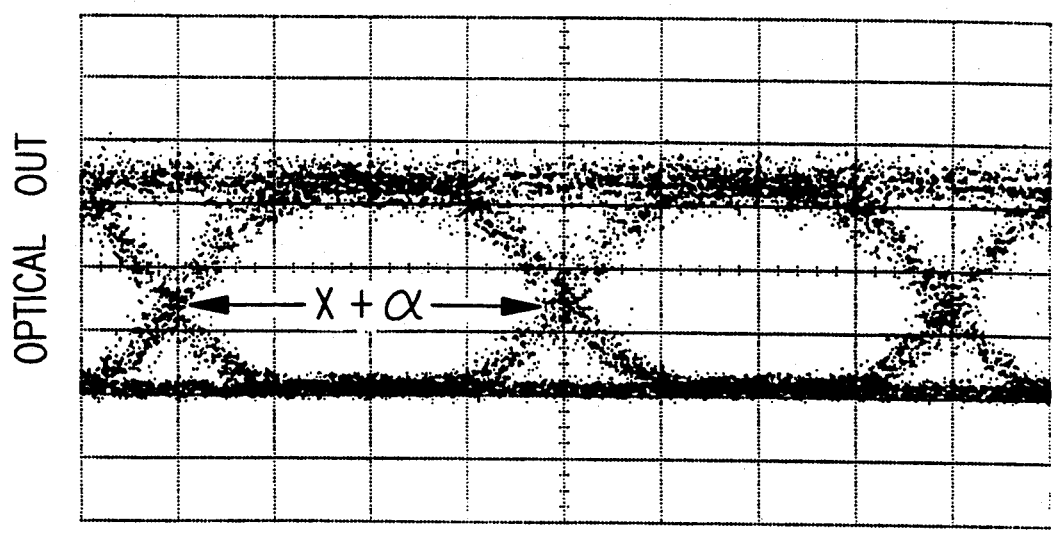
FIG. 7 contains an eye diagram of a 5 Gb/s output signal from an external modulator utilizing an ABC circuit of the present invention.

FIGS. 6 and 7 further illustrate the improvement in performance of an externally modulated laser transmitted when utilizing an ABC circuit of the present invention. FIG. 6 contains what is referred to as an "eye diagram" representative of a digital optical output signal as a function of time. For the representation of FIG. 6, the external modulator does not include a control circuit for the bias voltage and the particular eye diagram is representative of digital transmission at 5Gb/s for at least ten minutes after turn-on. As can be seen, the cross-over between logic levels is significantly drooped from the desired midpoint value, and the eye opening, indicated by the letter X, is relatively narrowed from the ideal. Both of these conditions result in introducing errors into the transmission stream, as indicated by the BER curve of FIG. 5. FIG. 7 illustrates an eye diagram of a like transmitter (5Gb/s digital signal, 10 minutes after turn-on) which includes the ABC circuit of the present invention. As can be seen, the cross-over between the logic levels remains essentially at the midpoint and the eye opening is substantially larger, as shown by the value $X+\alpha$ in FIG. 7. The increase in eye opening thus allows for the BER to remain essentially constant, as shown in the graph of FIG. 5.

We claim:
1. An externally optical transmitter comprising
   a transmitting optical device based to produce an essentially constant optical output signal;
   driver means responsive to an electrical data signal for forming an electrical drive signal therefrom;
   modulating means responsive to the constant optical output signal and the electrical drive signal for utilizing said electrical drive signal to modulate said constant optical signal and provide as an output an optical data signal which essentially replicates the electrical data signal; and
   automatic bias control means coupled to the drive means and the modulating means for monitoring the output optical data signal and providing bias voltage correction to said modulating means, the automatic bias control means comprising
   reference means for providing an electronic dither signal having a predetermined frequency and transmitting said dither signal to the driver means for amplitude modulating said electrical drive signal;
   receiving means responsive to the output optical data signal from the modulating means for converting said output optical data signal into a reconstructed electrical representation thereof; and
   means for comparing the phase of the dither signal to the phase of the reconstructed electrical signal and providing as an output of the automatic bias control means a DC electrical control signal representative of the relation between the phases, said DC electrical control signal being applied as a DC bias input to the modulating means.

2. An externally modulated optical transmitter as defined in claim 1 wherein the comparing means of the automatic bias control circuit comprises first zero-crossing means responsive to the dither signal to form a digital representation thereof;

second zero-crossing means responsive to the reconstructed electrical signal to form a digital representation thereof;

phase comparing means responsive to the outputs from the first and second zero-crossing means for providing a digital output signal representative of the phase difference between the inputs applied thereto;

means responsive to the digital output signal from the phase comparing means smoothing the digital signal and forming therefrom the DC electrical control signal output of the automatic bias control circuit.

3. An externally modulated optical transmitter as defined in claim 2 wherein the phase comparing means comprises a flip-flop including a data input, clock input and a pair of complementary outputs, the output of the first zero-crossing means coupled to the data input, the output of the second zero-crossing means coupled to the clock input and a selected output from the pair of complementary outputs applied as the input to the smoothing means.

4. An externally modulated optical transmitter as defined in claim 2 wherein the smoothing means comprises a low pass filter coupled to the output of the phase comparing means and an integrator responsive to the output of the low pass filter 5. An externally modulated optical transmitter as defined in claim 1 wherein the modulating means comprises a Mach-Zehnder interferometer comprising a bulk optical material including a pair of optical waveguides capable of supporting transmission of an input lightwave signal; and a plurality of electrodes formed on the surface of the bulk optic material so as to be located over the optical waveguides, the plurality of electrodes comprising a pair of DC bias electrodes, a DC bias electrodes disposed over each waveguide of the pair of waveguides and further comprising a pair of RF signal electrodes, an RF signal electrode disposed over each waveguide in a contiguous relationship with the associated DC electrode, the pair of DC bias electrodes coupled to receive the DC bias voltage generated by the automatic bias control means and the pair of RF signal electrodes coupled to receive the electrical data signal generated by the driving means.

6. An externally modulated optical transmitter as defined in claim 1 wherein the driving means comprises a push-pull differential driving arrangement.

7. An externally modulated optical transmitter as defined in claim 1 wherein polarization maintaining optical waveguides are utilized to couple the transmitting optical device to the modulating means.

8. An externally modulated optical transmitter as defined in claim 7 wherein polarization maintaining optical fiber is utilized.

9. A control circuit arrangement for monitoring and adjusting the DC bias voltage applied to a Mach-Zehnder interferometer, the Mach-Zehnder interferometer having a constant input optical signal and utilizing an electrical input data signal to modulate the input signal and produce as an output an optical data signal, control circuit comprising reference means for providing an electrical dither signal having a predetermined frequency and applying the dither signal as an amplitude modulator for the electrical data input to the interferometer;

receiving means responsive to the optical output data signal for converting said optical output data signal into a reconstructed electrical representation thereof; and means for comparing the phase of the dither signal to the phase of the reconstructed electrical signal and providing the DC bias voltage output of the control circuit arrangement, said DC bias voltage being a constant value as long as the phase of the reconstructed electrical signal is essentially identical to the phase of the dither signal.

10. A control circuit as defined in claim 9 wherein the phase comparing means comprises first zero-crossing means responsive to the dither signal to form a digital representation thereof;

second zero-crossing means responsive to the reconstructed electrical signal to form a digital representation thereof;

phase comparing means responsive to the outputs from the first and second zero-crossing means for providing a digital output signal representative of the phase difference between the digital inputs applied thereto; and means responsive to the digital output from the phase comparing means for smoothing the digital signal and forming as an output the DC electrical signal output of the control circuit.

11. A control circuit as defined in claim 10 wherein the phase comparing means comprises a flip-flop including a data input, clock input and a pair of complementary outputs, the output of the first zero-crossing means applied to the data input, the output of the second zero-crossing means applied to the clock input and a selected one of the pair of complementary outputs applied as an input to the smoothing means.

12. A control circuit as defined in claim 10 wherein the smoothing means comprises a low pass filter and an integrator.

13. A method of controlling the bias voltage applied as an input to a Mach-Zehnder interferometer, the Mach-Zehnder interferometer having a constant value optical input signal and utilizing an input electrical data signal to modulate the constant optical signal and form an output optical data signal, the method comprising the steps of:

a) providing a reference signal at a predetermined frequency;

b) amplitude modulating the input electrical data signal with the reference signal;

c) converting the optical output data signal from the interferometer into an electrical representation;

d) digitizing both reference signal and the electrical representation of the optical output data signal;

e) comparing the phase of the digitized reference signal to the phase of the digitized electrical representation of the optical output signal; and f) generating a DC bias voltage as a function of the phase comparison of step e), the DC bias voltage remaining constant as long as the phases are essentially identical and otherwise either increasing or decreasing to obtain equality.

* * * * *